Figure 1:
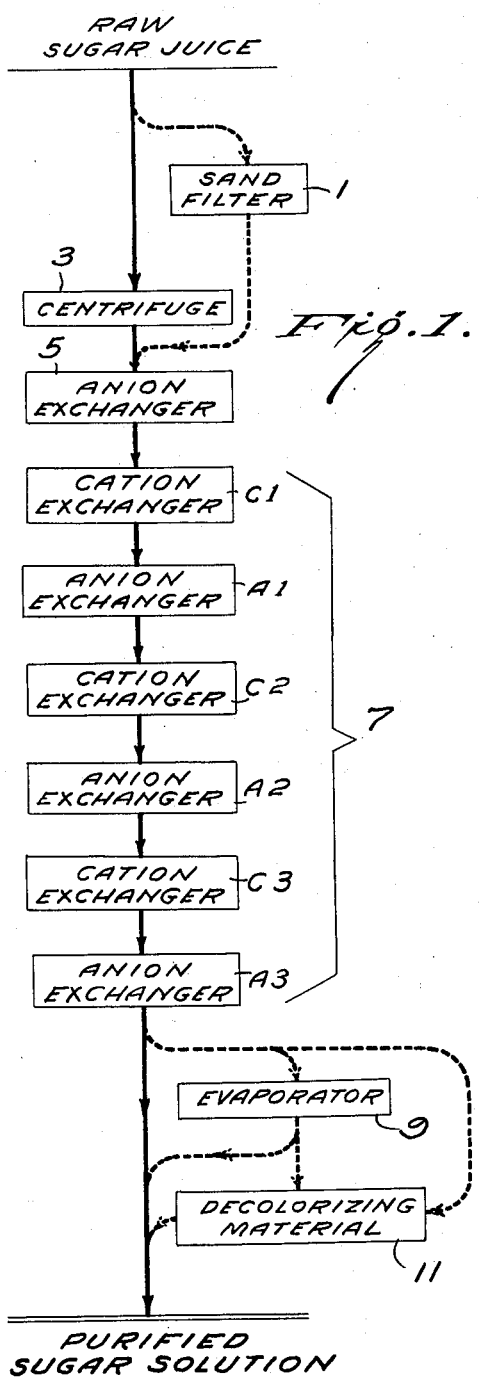

Nov. 3, 1959     W. A. BLANN     2,911,329

SUGAR PURIFICATION WITH ION EXCHANGERS

Original Filed Nov. 17, 1945

INVENTOR

WILLIAM A. BLANN,

BY

ATTORNEY

United States Patent Office 2,911,329
Patented Nov. 3, 1959

2,911,329

SUGAR PURIFICATION WITH ION EXCHANGERS

William A. Blann, Milwaukee, Wis., assignor to American Cyanamid Company, New York, N.Y., a corporation of Maine Continuation of application Serial No. 629,307, November 17, 1945. This application April 10, 1953, Serial No. 351,654

1 Claim. (Cl. 127—46)

This invention relates to the purification of aqueous solutions of a sugar and more particularly to the purification of raw juices obtained from plants and fruits, such as sugar cane juice, sorghum juice, beet juice, pineapple juice, etc.

An object of the present invention is to provide a process of purifying aqueous solutions containing sugars and more particularly raw juices such as sugar cane juice.

Another object of the present invention is to provide an improved method of purifying aqueous solutions of a sugar with ion exchangers.

Still another object of this invention is to provide a method of purifying aqueous solutions of sugars wherein the formation of free acid is minimized and also wherein the free acidity which may be present in the solution is removed early in the process.

A further object of this invention is to reduce the inversion of sugar which occurs when sucrose solutions are treated with ion exchangers.

These and other objects are attained by a process comprising the step of passing an aqueous solution of a sugar through an anion exchanger before it is passed through a cation exchanger. If the solution to be purified is a raw sugar juice it is preferably fed to the anion exchanger after being filtered or centrifuged for the purpose of removing suspended matter such as sand, etc. Thereafter the juice is purified by passing it through a system including a plurality of pairs of ion exchangers, the first of each pair being a cation exchanger and the other being an anion exchanger. After passing through all of the ion exchangers it is often desirable to pass the solution through a decolorizing material to remove residual traces of coloring matter which may be present. When a raw sugar juice is purified in accordance with the present invention, the system is operated while the pH of the influent to the final anion exchanger is more than 2.9 and while the pH of the effluent from said final anion exchanger is at least 4. If high quality sugar is to be crystallized from the purified sugar solution, it is desirable that the influent to the final anion exchanger contain less than 600 p.p.m. of acid as determined by titration, and assuming that the acid has an equivalent weight of 50 and also while said influent contains less than 50 p.p.m. of cations, assuming that the cations have an equivalent weight of 50. The purified sugar solution is suitable for concentration to form high-quality syrups, or high-quality sugar may be crystallized therefrom. The operation of the process in the present invention with the exception of the use of the preliminary anion exchanger is more fully described and claimed in the patent of the present inventor and Walter W. Durant, co-inventor, Patent No. 2,522,022, issued November 17, 1945, and entitled "Sugar Purification Processes."

The drawing shows two embodiments of my invention.

In Figure 1, raw sugar juices passes through a centrifuge 3 or through a sand filter 1, then through an anion exchanger 5 before any other chemical treatment, and thence through a system 7 comprising a cation exchanger C1, an anion exchanger A1, a cation exchanger C2, an anion exchanger A2, a cation exchanger C3 and an anion exchanger A3. The purified sugar solution flowing from system 7 may be used directly or optionally it may be passed through either an evaporator 9 or a decolorizing material 11 or both.

Figure 2:
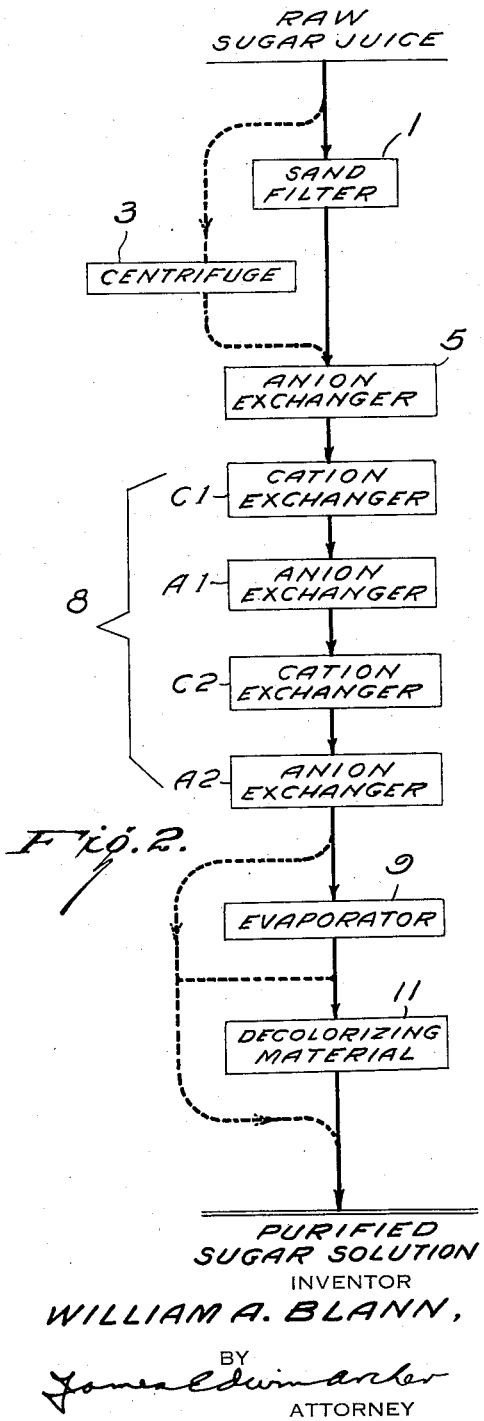

In Figure 2, raw sugar juice passes through a sand filter 1 or through a centrifuge 3 and thence through an anion exchanger 5 before any chemical treatment. The effluent from anion exchanger 5 flows through a system 8 which comprises a cation exchanger C1, an anion exchanger A1, a cation exchanger C2 and an anion exchanger A2. From system 8 the purified juice flows through an evaporator 9 and a decolorizing material 11. Optionally the sugar solution may by-pass the evaporator 9 or the decolorizing material 11.

The following example in which the proportions are in parts by weight, except where otherwise indicated, is given by way of illustration and not in limitation. The analyses and other data given herein are all based upon the assumption that the cations and anions have an equivalent weight of 50.

EXAMPLE 1

Using a system as in Figure 2, about 6½ cubic feet of a guanidine-melamine-formaldehyde resin prepared in accordance with Example 1 of Swain Patent No. 2,285,750 are placed in a suitable container to form an anion exchanger 5, while about 3½ cubic feet of the same resin are placed in anion exchangers A1 and A2. About 3½ cubic feet of a cation exchanger, prepared in accordance with the disclosure in Patent No. 2,372,233, particularly Example 5, are placed in suitable vessels to form cation exchangers C1 and C2. A bed of decolorizing material 11 is optionally employed and this may contain about 3½ cubic feet of decolorizing charcoal or bone char. The preliminary bed of anion exchanger 5 is activated with about 15 pounds of sodium hydroxide diluted to a concentration of about 2%, whereas the anion exchangers A1 and A2 are activated with about 10 pounds of sodium hydroxide and 5 pounds of sodium hydroxide, respectively, diluted in the same way. The cation exchangers C1 and C2 are activated with about 14 pounds of sulfuric acid and 10 pounds of sulfuric acid, respectively, and in each case diluted with sufficient water forming a solution having a concentration of about 2%. After activation, the ion exchangers are each rinsed with about 1–2 volumes of water, the first exchanger being rinsed with raw water and the other exchangers being rinsed with the effluent from the preceding bed after about 1–2 volumes of effluent have been discarded therefrom. When the entire system is rinsed so that the sodium content of the effluent is about the same as the sodium content in the influent water, the system is ready for operation after all free liquid in the beds of ion exchangers is drained off.

The first bed of anion exchange resin 5 is filled from the top while the vessel containing the resin is open to the atmosphere, and when full, the next bed in the series C1 is filled from the top with the effluent from the bottom of the anion exchanger 5. The entire system is filled and about 256 gallons of a raw sugar juice which has been centrifuged by passing through the centrifuge 1 is fed into the system at the rate of 2 gallons per minute. The raw juice has a pH of about 5.5 and has the analysis shown in Table I.

The effluent flowing from anion exchanger 5 during the operation of the system in accordance with this example varies from about 11 to about 10, and the free alkalinity from about 1000 p.p.m. to about 200 p.p.m. The effluent from the cation exchanger C1 falls to a minimum of 2.6 whereas in the ordinary process where the cation exchanger is the first of the series the pH ordinarily falls to about 1.8 or less. The effluent from anion exchanger A1 ranges in pH from about 11 down to 7 whereas in the ordinary system the pH may go down as low as 4.5. The pH of the effluent from the cation exchanger C2 falls to a minimum of about 3.6 whereas ordinarily the pH falls to about 3. The purified effluent flowing from the anion exchanger A2 has a pH ranging from about 10 to 4.6 and the total collected effluent after mixing has a pH of about 5.5. After the solution has been purified with the ion exchangers and concentrated to a syrup, it has the analysis shown in Table I. As indicated in Table I, I am able to obtain excellent removal of both ash and organic non-sugar impurities by the use of the present process, and it will also be apparent that the losses by inversion are minimized by my improved process.

*Table I*

|  | Raw Juice | Purified Syrup |
|---|---|---|
| Total Solids (Brix) | 14.04 | 62.9 |
| Sucrose (% of Solids) | 80.5 | 89.5 |
| Reducing Sugars (% of Solids) | 7.7 | 9.8 |
| Total Non-Sugars (% of Solids) | 11.8 | 0.7 |

(Ash and organic acids etc.) percent removal, 94.

|  | Raw Juice | Purified Syrup |
|---|---|---|
| Sodium (% of Solids) | 0.009 | .019 |
| Potassium (% of Solids) | 1.61 | .004 |
| Calcium and Magnesium (% of Solids) | 0.61 | .003 |

(Ash alone) percent removal, 98.

In place of part or all of the anion active resin used in the example other anion active materials may be substituted. Among these are the aldehyde condensation products of m-phenylene diamine, biguanide, guanyl urea, substituted guanidines such as methyl guanidine, substituted biguanides, such as phenyl biguanide, polyamines preferably the polyethylene polyamines, etc. Such condensation products are preferably formaldehyde condensation products although other aldehyde condensation products may be used if desired. Examples of other aldehydes are furfural, acrolein, benzaldehyde, etc. The active resins, such as those prepared from guanidine, guanyl urea, biguanide and other materials which do not form sufficiently insoluble condensation products with formaldehyde for most practical purposes, are preferably insolubilized with suitable formaldehyde reactive materials, e.g., urea, thiourea, the aminotriazines (especially melamine and the guanamines which react with formaldehyde to produce insoluble products), etc. The anion active resins prepared from guanidine, guanyl urea, biguanide, etc. may be prepared in the same general manner as described in U.S. Patents Nos. 2,251,234 and 2,285,750. Usually it is convenient to use the salts of the bases but the free bases may also be used. Examples of suitable salts for use in the preparation of anion active resins are guanidine carbonate, guanidine sulfate, biguanide sulfate, biguanide nitrate, guanyl urea sulfate, guanyl urea carbonate, etc. U.S. Patents Nos. 2,251,234 and 2,285,750 describe methods of preparing many anion active resins of the aforementioned types.

It is preferable that the first bed of anion exchanger be activated with sodium hydroxide or potassium hydroxide.

The anion active resins A1, A2 (and A3 if three pairs of exchangers are used) are activated by treatment of a dilute solution of an alkali such as sodium hydroxide, sodium carbonate and the corresponding potassium salts. Generally, the concentration should be about 0.1–10%. The same concentration of the sodium or potassium hydroxides is suitable for use in activating the preliminary bed of anion exchanger 5.

Other examples of suitable cation active material which may be operated on the hydrogen cycle are: aldehyde condensation products of alpha-furyl substituted organic sulfonates such as those disclosed in U.S. Patent No. 2,373,152, polyhydric phenolaldehyde condensation products such as the catecholtannin-formaldehyde condensation products, aromatic sulfonic acid-formaldehyde condensation products (as described in U.S. Patent No. 2,204,539), the carbonaceous zeolites, i.e., the sulfated or sulfonated carbonaceous materials such as coal, peat, lignite, etc. Any of these materials may be operated on the hydrogen cycle and they are therefore suitable for use in accordance with my invention. Broadly speaking, these substances may be termed "hydrogen zeolites." The activation of the cation active materials with an acid and the exchange or reaction of the hydrogen ion of said acid during the purification process is known as "the hydrogen cycle."

Cation active materials may be regenerated or activated by passing dilute acid solution, e.g., 0.1–10% of hydrochloric acid, sulfuric acid, etc., through the bed and subsequently washing with water until substantially free of the acid used. The cation active resins are then said to be "hydrogen activated." If the solution flowing into cation active bed C1 be one containing a high concentration of calcium, it may be desirable to activate the bed with a salt solution such as an aqueous solution of sodium chloride before activation with the acid.

At the start of my process, the beds are preferably "sweetened on" by the following procedure: the ion exchangers are activated or back-washed and regenerated if necessary, then rinsed and finally drained. Thus with a system as in Figure 1, the juice is fed to the cation exchanger C1 while it is open to the atmosphere and until the bed is full of juice at which point the vessel containing the cation exchanger is closed and the effluent is then drawn therefrom while continuing to feed juice thereto, and this effluent is employed to fill bed A1 while it is open to the atmosphere. When bed A1 is full, the vessel containing the ion exchanger is closed and the effluent is then fed to bed C2. Each of the beds of ion exchangers are filled in this manner until the system is entirely full, at which time the effluent from bed A3 is collected. This effluent from bed A3 is collected while it has a pH greater than 4 and while the pH of the influent to bed A3 is above 2.9. A similar procedure is used when systems of the type shown in Figure 2 are used.

While my process is particularly applicable to the purification of raw sugar juices, it may also be used to purify partially-refined sugar solutions. The present process is especially adapted to the purification of sugar solutions obtained from sorghum or from sugar cane or if desired, it may be used in the purification of juices obtained from sugar beets. Other types of sugars which may be purified by my process are: maple sugar, invert sugar, malt sugar, dextrose, fructose, glucose, etc., as well as natural and synthetic mono-, di-, tri-, tetra-, and other poly-saccharides.

In order to minimize inversion of the sugar solutions in the manufacture of sucrose, it is desirable that the temperature of the juice during treatment be kept at about ordinary room temperatures, but if some or a considerable amount of inversion is permissible, higher temperatures may be employed.

The treatment of sugar syrups with ion active materials in accordance with this invention is often sufficient to purify the sugar without the use of any other purification processes or purification agents. However, as heretofore pointed out, it is quite often desirable that a decolorizing agent be employed to remove residual color in the sugar solution after passage through the ion exchange materials. Similarly, in some cases it is desirable that the sugar solution be treated with a decolorizing material in between any two of the beds of ion active materials, but it has been found that it is not as effective when the fluid passing therethrough has a high ion content. Among the substances which may be employed are bone black, diatomaceous earth, bauxite, decolorizing charcoal, oxidizing agents, etc.

The presence of salts, acids and organic non-sugar solids in sugar solutions tends to stabilize the colloidal coloring materials therein. Accordingly, the removal of a high proportion of the salts and organic non-sugar solids by means of my process renders the colloidal coloring materials less stable and they are, therefore, more easily removed by passage through bone char filters. When decolorizing charcoal is used, it is preferably employed after the treatment of the ion exchange substances and after concentration to a syrup, but it may be used at any point in the system, and when not used at the end of the purification system, it is preferably used after passage through a cation active material when the fluid passing through the decolorizing material is acidic. Decolorizing materials may also be mixed with the juice before or during evaporation of water therefrom and then the materials may be removed by filtering the concentrated syrup.

This application is a continuation of my co-pending application Serial No. 629,307, filed November 17, 1945, now abandoned.

Obviously many modifications and variations in my processes and compositions may be made without departing from the spirit and scope of the appended claim.

I claim:

A process which comprises passing a raw sugar juice through an hydroxyl activated anion exchanger prior to treatment with a cation exchanger and thence through a system comprising a series of ion exchangers including a plurality of pairs of ion exchangers, one of each pair being a hydrogen zeolite and the other of each pair being an anion exchanger, continuing to pass said juice through the system while the pH of the influent to the final anion exchanger is higher than 2.9 and while said influent contains less than about 600 p.p.m. of acid as determined by titration, and assuming that the acid has an equivalent weight of 50, and also while said influent contains less than 50 p.p.m. of cations assuming that the cations have an equivalent weight of 50.

References Cited in the file of this patent

UNITED STATES PATENTS

| | | |
|---|---|---|
| 2,470,500 | Lawrence | May 17, 1949 |
| 2,635,061 | McBurney | Apr. 14, 1953 |

OTHER REFERENCES

Buck et al.: Ind. and Eng. Chem., vol. 37, No. 7, July 1945, pp. 635–638

"Sugar," July 1956, "Future of Ion Exchange Refining," pp. 26, 27, 45 and 46.

"Sugar," reprinted from April 1955 Sugar, pp. 43–45.

Ion Exchange: Quality of Sugar Produced by Reverse Cycle Purification of Juices, by Forte and Smith.